Aug. 15, 1967   W. R. HAMILTON, JR   3,335,953
MOLDED PLASTIC INSULATED JOINTS
Filed June 2, 1966
FIG. 1.
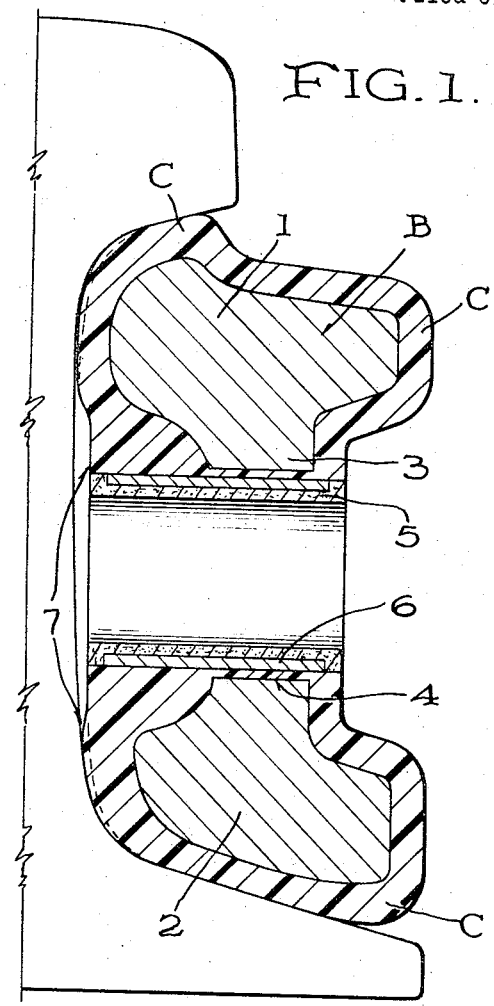
FIG. 2.
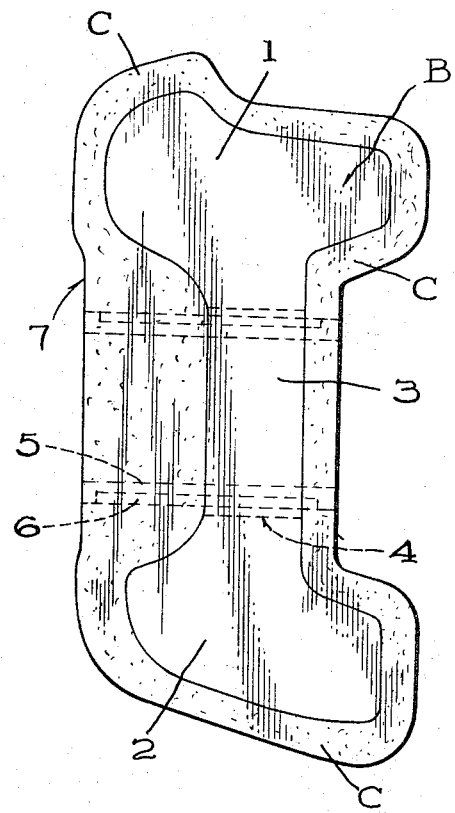
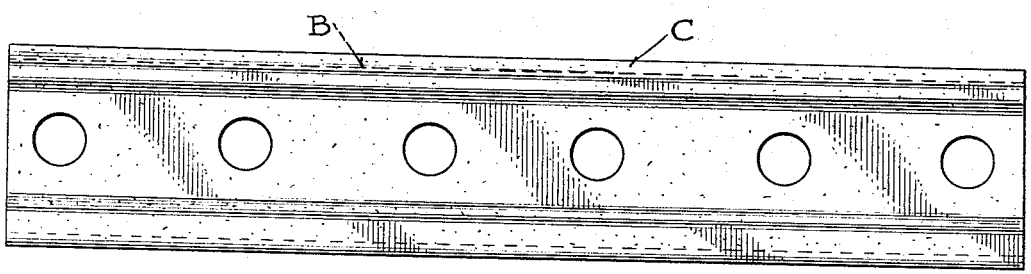
FIG. 3.
INVENTOR
WILLIAM R. HAMILTON
BY Emory L. Groff Jr.
ATTORNEY United States Patent Office 3,335,953
Patented Aug. 15, 1967

3,335,953
MOLDED PLASTIC INSULATED JOINTS
William R. Hamilton, Jr., Fairfield, Conn., assignor to Poor & Company, Chicago, Ill., a corporation of Delaware
Filed June 2, 1966, Ser. No. 554,796
3 Claims. (Cl. 238—243)

ABSTRACT OF THE DISCLOSURE

An insulated railway track joint comprising a metal core provided with insulating bushings and having an outer covering of a synthetic thermosetting resin.

This invention relates to insulated joints for use in railway track.

Heretofore, it has been universal practice to use strips of so-called hard fibre insulation between the portions of the joint bar and the rail which would otherwise engage each other, and also to provide ferrules of the same material to insulate the bolts from the rail. This practice has been followed over a long period of years but has the disadvantage that this type of insulation not only works out from between the joint bars and the rail, due to relative movement between rail ends and bars resulting from wave motion in the track, but, in many cases, the insulation becomes broken or cut which causes a short circuit that renders the block system in which the joints are installed ineffective.

Also, vulcanized hard fibre has the disadvantage that after a period of time, it absorbs moisture and brine, or other condensed drippings, which materially contribute to swelling and the general disintegration of the insulation to the point that for proper maintenance frequent renewals must be made. In many cases, the fibre insulation has been provided with a metal sheath or cover of various sorts to confine, compress, and protect it, but this involves added cost and complicates installation and maintenance. Thus, unless hard fibre is constantly kept under compression in the joint, it rapidly disintegrates. A loose joint also encourages deterioration. If bundles of insulation are allowed to lay along the right-of-way, any amount of time, the fibre starts to disintegrate.

In addition to the recognized weaknesses of the use of vulcanized fibre, there is always the problem of high maintenance costs involved from the standpoint of time and labor, in effecting renewals. The insulation has been necessarily separate from the joint bars, and in order to install renewals, it is necessary to dismantle the entire joint and resort to the expensive maintenance procedure of refitting the separate insulation pieces to the bars and tediously maintaining them in correct relation thereto when the bolts are drawn into final position.

Accordingly, one of the objects of the invention is to provide an insulated joint bar wherein the disadvantages above noted are eliminated and the longevity of the insulation greatly increased. That is to say, the present invention contemplates a joint bar whose outer lengthwise surfaces are covered by a tough abrasion-resistant relatively pliable elastomer with a memory as distinguished from a bar having a rigid surface. That is to say, under bolt pressure the insulation will be prestressed in compression into the head and base fillets of the rail as well as the fishing surfaces at the head and base of the rail without mashing out.

Another object of the invention is to provide an insulated head-free joint bar which may be readily and safely handled as a consolidated unit thereby not only reducing the number of parts but also providing a much safer insulated joint in the respect that it provides the maximum protection against short circuits and consequent signal failures. By using a yieldable elastomeric material, wear is reduced between the bars and the rail ends under flexure of the rails by rolling loads, and which moreover will better withstand abrasion because the relative flexing movement of the insulating material will simply be kneaded without perceptible sliding movement, and, although the material attains a more or less permanent set, nevertheless, when relieved of pressure, it tends to return to its original shape.

A still further object is to provide an insulated rail joint including a rolled core which will fit reasonable variations in the weight of the rails with which it is to be used. For example, a rolled bar having given physical properties to connect 131# rails may also serve to fit 132# rails because the difference in fishing area can be made up by, or compensated for, due to the amount used as well as the self-adjusting qualities of polyurethane or other equal elastomeric material used as a facing for the rolled bar.

With the above and other objects in view which will more readily appear as the nature of the invention is better understood, the same consists in the novel construction, arrangement, and combination of parts as hereinafter more fully described, illustrated and claimed.

In the drawings:

FIG. 1 illustrates a portion of a rail end in elevation embodying the present improvements taken at a point in the track where the rail ends meet, and illustrates an improved head-free type joint bar in cross section.

FIG. 2 is an end elevation of the bar shown in FIG. 1.

FIG. 3 is a side elevation of the insulated joint bar shown in FIG. 1.

Similar reference characters designate corresponding parts throughout the several figures of the drawing.

The basic feature of the invention is to mold a plastic material in fluid form about a rolled steel core of the head-free bar type and having insulation bushings to provide a superior homogenous insulated joint.

The joint bar includes a metal core B having a rolled sectional modulus calculated mathematically for strength and design to support the load of a rail section of given weight per yard, as above indicated, and, similarly, a single section may be rolled for use with bars of 112# and 115# class, or other rail weights. In other words, the present invention makes it possible to provide a rolled head-free core which may be used for more than one rail section, although it will be understood that one single core may be used for different rails within a reasonable weight variation per yard, and several core sections will be useful in covering the entire range of rail weights.

The elastomeric covering for the rolled core is formed thicker at the inner side of the web, between the top and bottom flanges, to provide space for accommodating a moderate degree of flow of the tough elastomeric material, such as polyurethane, when the bolts are tightened and final pressures are exerted on the head and base fillets of the rails.

As shown in the drawings, the joint bar B is provided with head and foot portions 1 and 2 connected by web 3 having bolt holes 4.

As will be seen from FIG. 1, the bolt holes 4 are each fitted with a composite tubular insulating bushing 5. This bushing is preferably of substantially spool shape cross section and has both its outer end projecting from the metallic surface of the bolt hole 4 to be imbedded in the plastic covering C of the insulation material as it is applied and adheres to all outer lengthwise surfaces of the bar. The bushing 5 has a metal band 6 surrounding the body of the spool, but such band does not project beyond the flanges of the body of the bushing.

The insulation cover C is of substantially uniform thickness throughout the head, foot, and outer surface of the core bar B, but as will be clearly apparent from FIGS. 1 and 2, the inner face of the bar is substantially thicker in the zone of the bolt holes, and between the lower portion of the head of the bar and the upper portion of the foot of the bar is provided with an easement 7 which permits the insulation material C at the head and foot of the bar to flushly and firmly engage the head and base fillets of the fishing space of the rail. That is to say, the purpose of the easement is to provide a space for the material to flow on application of load while the bar is seating itself into the rail fishing.

The bars may be manufactured by available convenient manufacturing procedures, but by way of illustration, the following equipment and steps may be followed.

For example, the joint bar may be made in a two-piece matched die whose cavity has the external shape or configuration of the desired joint bar. In one half of the mold, cylindrical pins, approximately the diameter of the outside of the bushing, are fitted. That is to say, these pins are placed in one half of the die and located on a line horizontally equal to the base to center dimension, and spaced equal to the punching details of the joint. To change the spacing of the pins, it would be necessary to change the plate in the die. It will, of course, be understood that these pins are fastened into half of the die and extend through drill holes in the bar to flushly engage with the opposite side of the die, but not fastened to it. The joint bar is positioned in the die by three holes drilled in its ends. Two holes on one end, located one in the head and one in the base, and one hole in the opposite end in the head. The joint bar is placed in the die on the locating pins and then the plate with the pins is passed through the holes and clamped. The die is then filled with the selected adhesive resinous synthetic material and cured. The curing cycle will depend somewhat on the particular type of resin utilized. Many materials are available, such as urethane with a hardness of Shore 59 D or alternatively, it may be a commercial product identified as Shore 92 A.

The bushing is made separately in another mold and is preferably made of hard urethane material.

As previously explained, the bushing is reinforced on the outside for a part of its length by a steel ferrule 6. This is reinforcement for the bushing against lateral bending stresses and the actual bending of the bolts which may occur in track under heavy longitudinal tensile stresses. The bushings are force-fitted into the holes after the curing of the joint bar. If the force-fit is sufficient, no additional bonding is necessary, but it will be understood that they could also be bonded with an appropriate compatible adhesive if necessary.

From the foregoing, it will be understood that the external faces of the metal core are used to integrally support a plastic cover such, for example, as polyurethane, which exhibits great toughness and abrasion resistance. In any event, the covering material is used which may be pre-stressed in compression through the use of high bolt loads to better withstand the bending forces imposed by rolling wheel loads of a passing train.

I claim:

1. An article of manufacture in the form of a one-piece composite insulated rail-end splicing member prefabricated to be handled as a single unit, comprising, a rolled metal core whose cross-sectional profile has physical properties compatible with the rail sections to be connected, said core including head and foot portions connected by a web provided with bolt holes, bushings of insulating material having end portions terminating outwardly from the adjacent related faces of the metal bar web, a synthetic thermosetting covering encapsulating the lengthwise surfaces of the metallic core, said covering surrounding the projecting outer faces of said bushings and surrounding said core surfaces with substantially equal thickness on the outer top and bottom portions thereof, said covering overlying the inner side of said core web of substantially greater thickness than elsewhere to project into the fishing cavity initially toward the rail web to provide space affording an easement for inward movement of the bar under bolt pressure, whereby to insure all portions of said covering on the contact portions of said core, head and foot portions flushly contacting the underside of the rail head and the upper side of the rail flange.

2. An article of manufacture according to claim 1, wherein the cover material is polyurethane.

3. An article of manufacture in the form of a one-piece composite insulated rail-end splicing member prefabricated to be handled as a single unit, comprising, a rolled metal core whose cross-sectional profile has physical properties compatible with the rail sections to be connected, said core including head and foot portions connected by a web provided with bolt holes, bushings of insulating material having end portions terminating outwardly from the adjacent related faces of the metal bar to enable insulating material in a substantially fluid state to surround the projecting outer faces of said bushings, a synthetic thermosetting covering for the lengthwise surfaces of the metallic core, said covering presenting high abrasion resistance, high tear strength, excellent shock absorption, flexibility, chemical and oxygen resistance, and said bushings each surrounded by a metal ferrule medially for a portion of its length which is in contact with the insulating material constituting the covering for the outer surfaces of the bar.

References Cited

UNITED STATES PATENTS 3,206,123  9/1965  Baker _____ 238—349

FOREIGN PATENTS 919,548  2/1963  Great Britain.
920,548  3/1963  Great Britain.

ARTHUR L. LA POINT, *Primary Examiner.*

R. A. BERTSCH, *Assistant Examiner.*